United States Patent
Yamamoto

(10) Patent No.: US 9,992,559 B2
(45) Date of Patent: Jun. 5, 2018

(54) SENSOR MANAGEMENT DEVICE, SENSOR, MONITORING SYSTEM, SENSOR MANAGEMENT METHOD, SENSOR MANAGEMENT PROGRAM, MONITORING METHOD, AND MONITORING PROGRAM

(71) Applicant: SUMITOMO ELECTRIC INDUSTRIES, LTD., Osaka-shi, Osaka (JP)

(72) Inventor: Hirotsugu Yamamoto, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days. days.

(21) Appl. No.: 15/112,207

(22) PCT Filed: Nov. 10, 2015

(86) PCT No.: PCT/JP2015/081589
§ 371 (c)(1),
(2) Date: Jul. 18, 2016

(87) PCT Pub. No.: WO2016/139845
PCT Pub. Date: Sep. 9, 2016

(65) Prior Publication Data
US 2017/0013330 A1  Jan. 12, 2017

(30) Foreign Application Priority Data
Mar. 3, 2015 (JP) ................................. 2015-040824

(51) Int. Cl.
G08C 15/00 (2006.01)
H04Q 9/00 (2006.01)
G06T 11/20 (2006.01)

(52) U.S. Cl.
CPC ............ *H04Q 9/00* (2013.01); *G06T 11/206* (2013.01); *H04Q 2209/86* (2013.01); *H04Q 2209/88* (2013.01)

(58) Field of Classification Search
CPC .. H04Q 9/00; H04Q 2209/86; H04Q 2209/88; G06T 11/206
See application file for complete search history.

(56) References Cited

U.S. PATENT DOCUMENTS 5,430,433 A * 7/1995 Shima .................... G08B 25/10
340/531
8,562,558 B2 * 10/2013 Kamath ............... A61B 5/0002
604/66
(Continued)

FOREIGN PATENT DOCUMENTS

JP   H06-274779 A   9/1994
JP   H6-314390 A   11/1994
(Continued)

OTHER PUBLICATIONS

International Search Report dated Dec. 8, 2015 (published on Sep. 9, 2016) for PCT/JP2015/081589 (English translation).

*Primary Examiner* — Erin M File
(74) *Attorney, Agent, or Firm* — Drinker Biddle & Reath LLP

(57) ABSTRACT

A sensor management device according to an embodiment of the present invention is a sensor management device includes: a reception unit configured to receive sensor information indicating a measurement result obtained by a sensor; and a display control unit configured to perform control of displaying a screen on which the measurement result indicated by the sensor information received by the reception unit is associated with the sensor, wherein the display control unit performs control of changing a display content of the screen in such a manner as to allow recog- (Continued)

nition of the sensor the sensor information of which has become unable to be received by the reception unit.

10 Claims, 9 Drawing Sheets

(56) References Cited

U.S. PATENT DOCUMENTS

| | | | |
|---|---|---|---|
| 2009/0002148 A1 | 1/2009 | Horvitz | |
| 2011/0264323 A1* | 10/2011 | Sakakibara | B60R 16/0232 701/31.4 |
| 2011/0316699 A1* | 12/2011 | Arunachalam | G08B 21/14 340/540 |
| 2014/0343736 A1* | 11/2014 | Meyer | G01M 3/18 700/283 |

FOREIGN PATENT DOCUMENTS

| | | |
|---|---|---|
| JP | H10-238179 A | 9/1998 |
| JP | H10-320042 A | 12/1998 |
| JP | 2000-154969 A | 6/2000 |
| JP | 2001-160190 A | 6/2001 |
| JP | 2003-018164 A | 1/2003 |
| JP | 2005-165611 A | 6/2005 |
| JP | 2010-533903 A | 10/2010 |
| JP | 2011-179215 A | 9/2011 |
| JP | 2012-083846 A | 4/2012 |
| JP | 2012-118851 A | 6/2012 |
| JP | 5456414 B2 | 3/2014 |
| JP | 2014-170348 A | 9/2014 |

* cited by examiner ary of Invention

SENSOR MANAGEMENT DEVICE, SENSOR, MONITORING SYSTEM, SENSOR MANAGEMENT METHOD, SENSOR MANAGEMENT PROGRAM, MONITORING METHOD, AND MONITORING PROGRAM

TECHNICAL FIELD

The present invention relates to a sensor management device, a sensor, a monitoring system, a sensor management method, a sensor management program, a monitoring method, and a monitoring program. In particular, the present invention relates to a sensor management device, a sensor, a monitoring system, a sensor management method, a sensor management program, a monitoring method, and a monitoring program which are for performing control of displaying on a screen a measurement result obtained by the sensor.

BACKGROUND ART

Various technologies for monitoring the state of a predetermined area have been developed. For example, Japanese Patent No. 5456414 (PATENT LITERATURE 1) discloses the following technology: an area-monitoring display method in which values or changed values regarding at least one kind of certain events are measured by a plurality of sensors arranged at various places in a monitoring target area, data obtained through the measurement is processed, and the processed results are displayed on a monitor screen, wherein the processed results are displayed so as to overlap an area display indicating the monitoring target area, and the positions of the processed results displayed on the area display on the monitor screen are set to be the positions that correspond or substantially correspond to the arrangement places of the sensors from which the processed results have been obtained. In the area-monitoring display method, a circular shape is used as a display shape of each processed result, the center of the displayed circular shape indicates the measurement place, the magnitude of the circular shape indicates the magnitude (absolute value) of the measurement value, and the color of the circular shape is translucent such that the processed result displayed so as to overlap the measurement place on the display of the monitoring target area can be seen.

CITATION LIST

Patent Literature

PATENT LITERATURE 1: Japanese Patent No. 5456414

SUMMARY OF INVENTION

Technical Problem

In such a technology as described above, there are cases where a measurement result from a certain sensor becomes unable to be obtained on the displaying side due to some cause.

However, PATENT LITERATURE 1 does not disclose any configuration for solving such a problem.

The present invention has been made in order to solve the above-described problem. An object of the present invention is to provide a sensor management device, a sensor, a monitoring system, a sensor management method, a sensor management program, a monitoring method, and a monitoring program which can support a user in a situation where, in a configuration in which a measurement result obtained by a sensor is displayed on a screen, the measurement result from the sensor has become unable to be obtained on the displaying side.

Solution to Problem (1) In order to solve the above problem, an aspect of the present invention is a sensor management device including: a reception unit configured to receive sensor information indicating a measurement result obtained by a sensor; and a display control unit configured to perform control of displaying a screen on which the measurement result indicated by the sensor information received by the reception unit is associated with the sensor, wherein the display control unit performs control of changing a display content of the screen in such a manner as to allow recognition of the sensor the sensor information of which has become unable to be received by the reception unit.

(10) In order to solve the above problem, a sensor according to an aspect of the present invention is a sensor including: a measurement unit configured to perform measurement; and a transmission processing unit configured to perform a process of transmitting sensor information indicating a measurement result obtained by the measurement unit, to a sensor management device capable of performing control of displaying a screen on which the measurement result indicated by the sensor information is associated with the sensor, wherein the transmission processing unit further performs a process of transmitting, to the sensor management device, OFF information indicating that a power source of the sensor has been turned off and identification information of the sensor.

(11) In order to solve the above problem, a monitoring system according to an aspect of the present invention is a monitoring system including: a sensor; and a sensor management device, wherein the sensor transmits sensor information indicating a measurement result obtained by the sensor, to the sensor management device, the sensor management device receives the sensor information transmitted from the sensor, and performs control of displaying a screen on which the measurement result indicated by the received sensor information is associated with the sensor, and the sensor management device performs control of changing a display content of the screen in such a manner as to allow recognition of the sensor the sensor information of which has become unable to be received by the sensor management device.

(12) In order to solve the above problem, a sensor management method according to an aspect of the present invention is a sensor management method to be performed in a sensor management device, the sensor management method including the steps of: receiving sensor information indicating a measurement result obtained by a sensor; performing control of displaying a screen on which the measurement result indicated by the received sensor information is associated with the sensor; and performing control of changing a display content of the screen in such a manner as to allow recognition of the sensor the sensor information of which has become unable to be received.

(13) In order to solve the above problem, a sensor management program according to an aspect of the present invention is a sensor management program to be used in a sensor management device, the sensor management program causing a computer to execute the steps of: receiving sensor information indicating a measurement result obtained by a sensor; performing control of displaying a screen on which the measurement result indicated by the received sensor information is associated with the sensor; and performing control of changing a display content of the screen in such a manner as to allow recognition of the sensor the sensor information of which has become unable to be received.

(14) In order to solve the above problem, a monitoring method according to an aspect of the present invention is a monitoring method to be performed in a sensor, the monitoring method including the steps of: performing measurement; performing a process of transmitting sensor information indicating a measurement result, to a sensor management device capable of performing control of displaying a screen on which the measurement result indicated by the sensor information is associated with the sensor; and transmitting, to the sensor management device, OFF information indicating that a power source of the sensor has been turned off and identification information of the sensor.

(15) In order to solve the above problem, a monitoring program according to an aspect of the present invention is a monitoring program to be used in a sensor, the monitoring program causing a computer to execute the steps of: performing measurement; performing a process of transmitting sensor information indicating a measurement result, to a sensor management device capable of performing control of displaying a screen on which the measurement result indicated by the sensor information is associated with the sensor; and transmitting, to the sensor management device, OFF information indicating that a power source of the sensor has been turned off and identification information of the sensor.

The present invention can be realized not only as a sensor management device that includes such a characteristic processing unit, but also as a semiconductor integrated circuit that realizes a part or the entirety of the sensor management device.

Advantageous Effects of Invention

According to the present invention, in a configuration in which measurement results obtained by sensors are displayed on a screen, it is possible to support a user in a situation where a measurement result from a sensor has become unable to be obtained on the displaying side.

DESCRIPTION OF EMBODIMENTS

Figure 1:
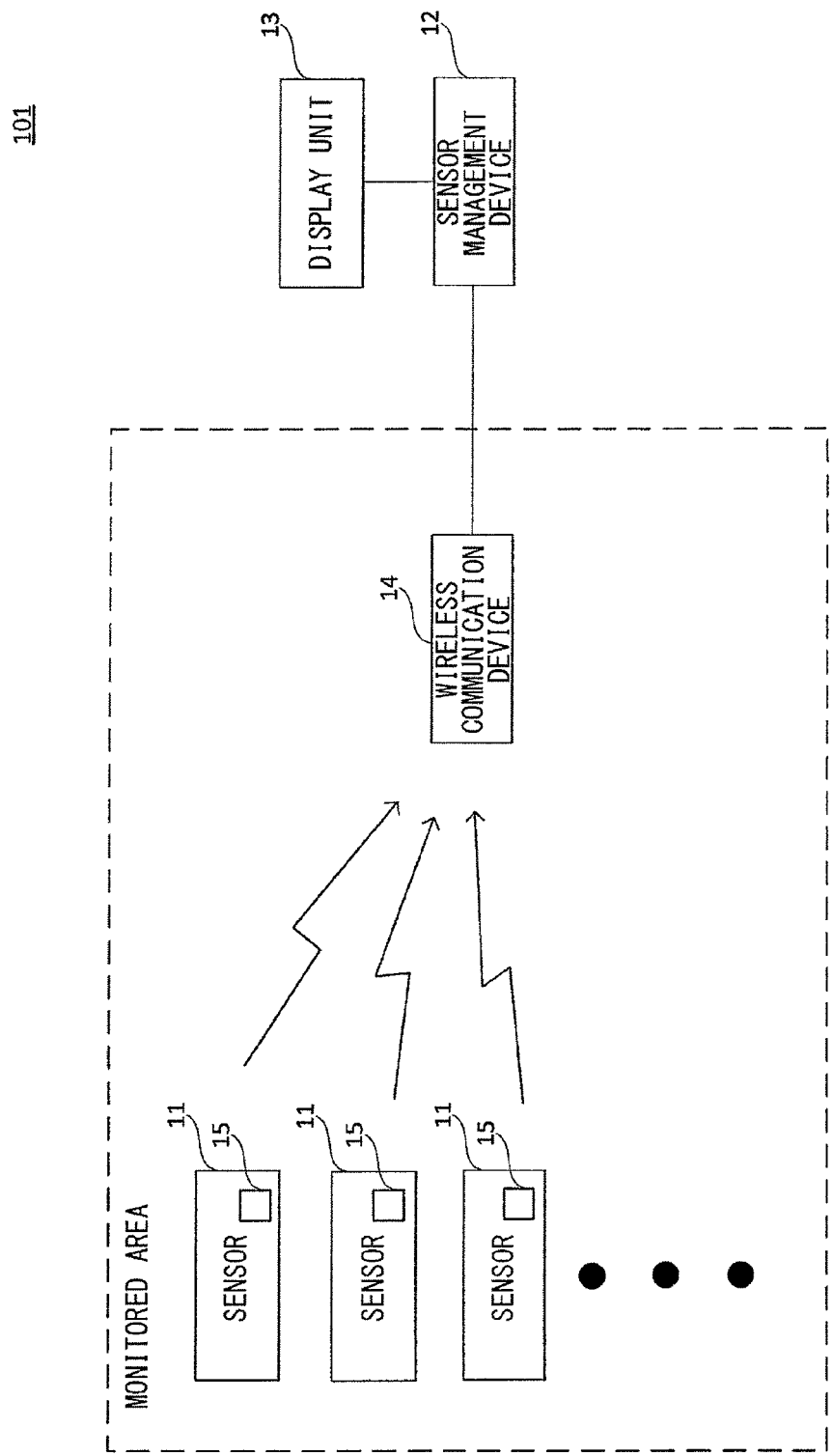
FIG. 1 shows a configuration of a monitoring system according to an embodiment of the present invention.

First, the contents of embodiments of the present invention will be listed and described.

(1) A sensor management device according to an embodiment of the present invention includes: a reception unit configured to receive sensor information indicating a measurement result obtained by a sensor; and a display control unit configured to perform control of displaying a screen on which the measurement result indicated by the sensor information received by the reception unit is associated with the sensor, wherein the display control unit performs control of changing a display content of the screen in such a manner as to allow recognition of the sensor the sensor information of which has become unable to be received by the reception unit.

With this configuration, for example, the user can easily distinguish a sensor for which transmission of sensor information to the sensor management device has stopped, from a sensor for which such transmission is being continued. In addition, for example, when the transmission of sensor information from a sensor has stopped, the user can quickly address the work necessary for recovering the sensor, such as investigation of the cause for the stop of the transmission. Thus, it is possible to shorten the period in which the measurement result from the sensor cannot be obtained. Thus, in a configuration in which measurement results obtained by sensors are displayed on a screen, it is possible to support the user in a situation where a measurement result from a sensor has become unable to be obtained on the displaying side.

(2) Preferably, the display control unit performs control of deleting, from the screen, a content in which the sensor the sensor information of which has become unable to be received by the reception unit is associated with the measurement result.

With this configuration, for example, the user can recognize the sensor for which the transmission of sensor information to the sensor management device is being continued, and when the screen display looks complicated, such complicated appearance can be eliminated.

(3) Preferably, the display control unit performs control of displaying the screen further showing a cause for which the sensor information has become unable to be received by the reception unit.

With this configuration, for example, the user can easily grasp the cause for which the transmission of sensor information from the sensor has stopped, without conducting investigation himself or herself. Thus, recovery of the transmission of sensor information can be efficiently performed.

(4) More preferably, the reception unit further receives, from the sensor, OFF information indicating that a power source of the sensor has been turned off, and when the OFF information has been received by the reception unit, the display control unit performs control of displaying the screen indicating, as the cause, that the power source of the sensor has been turned off.

With this configuration, the user can easily grasp that the cause for which the transmission of sensor information from the sensor has stopped is that the power source of the sensor has been turned off.

(5) More preferably, the sensor management device further includes a determination unit configured to determine communication quality between the sensor and the sensor management device, wherein when the communication quality has been determined as being poor by the determination unit, the display control unit performs control of displaying the screen indicating, as the cause, that the communication quality is poor.

With this configuration, the user can easily grasp that the cause for which the transmission of sensor information from the sensor has stopped is deterioration of the communication quality between the sensor and the sensor management device.

(6) More preferably, the reception unit further receives, from the sensor, battery information regarding a stored-power remaining amount of a battery of the sensor, and when the battery information indicating that the stored-power remaining amount is small has been received by the reception unit, the display control unit performs control of displaying the screen indicating, as the cause, that the stored-power remaining amount is small.

With this configuration, the user can easily grasp that the cause for which the transmission of sensor information from the sensor has stopped is shortage of the stored-power remaining amount of the battery in the sensor.

(7) More preferably, the display control unit performs control of displaying the screen indicating, as the cause, that the sensor has failed, or that the cause is unknown, instead of indicating the cause.

With this configuration, the user can recognize that the cause for which the transmission of sensor information from the sensor has stopped is a cause other than the cause that can be determined by the sensor management device.

(8) Preferably, the display control unit performs control of displaying the screen further showing a list of identification information of the sensor the sensor information of which has become unable to be received by the reception unit.

With this configuration, the user can confirm the list of sensors for which the transmission of sensor information to the sensor management device has stopped.

(9) Preferably, the display control unit performs control of resetting the display content of the screen regarding the sensor the sensor information of which has become able to be received by the reception unit again, to the display content not having been changed.

With this configuration, for example, the user can recognize that the transmission of sensor information to the sensor management device has been resumed. In addition, when sensor information has become able to be received in sensor management device again, the display of the screen can be automatically updated.

(10) A sensor according to an embodiment of the present invention includes: a measurement unit configured to perform measurement; and a transmission processing unit configured to perform a process of transmitting sensor information indicating a measurement result obtained by the measurement unit, to a sensor management device capable of performing control of displaying a screen on which the measurement result indicated by the sensor information is associated with the sensor, wherein the transmission processing unit further performs a process of transmitting, to the sensor management device, OFF information indicating that a power source of the sensor has been turned off and identification information of the sensor.

With this configuration, for example, the user can easily grasp that, when transmission of sensor information from a sensor has stopped, the cause for the stop of the transmission is that the power source of the sensor has been turned off. Therefore, in a configuration in which measurement results obtained by sensors are displayed on a screen, it is possible to support the user in a situation where a measurement result from a sensor has become unable to be obtained on the displaying side.

(11) A monitoring system according to an embodiment of the present invention includes: a sensor; and a sensor management device, wherein the sensor transmits sensor information indicating a measurement result obtained by the sensor, to the sensor management device, the sensor management device receives the sensor information transmitted from the sensor, and performs control of displaying a screen on which the measurement result indicated by the received sensor information is associated with the sensor, and the sensor management device performs control of changing a display content of the screen in such a manner as to allow recognition of the sensor the sensor information of which has become unable to be received by the sensor management device.

With this configuration, for example, the user can easily distinguish a sensor for which transmission of sensor information to the sensor management device has stopped, from a sensor for which such transmission is being continued. In addition, for example, when the transmission of sensor information from a sensor has stopped, the user can quickly address the work necessary for recovering the sensor, such as investigation of the cause for the stop of the transmission. Thus, it is possible to shorten the period in which the measurement result from the sensor cannot be obtained. Thus, in a configuration in which measurement results obtained by sensors are displayed on a screen, it is possible to support the user in a situation where a measurement result from a sensor has become unable to be obtained on the displaying side.

(12) A sensor management method according to an embodiment of the present invention is a sensor management method to be performed in a sensor management device, the sensor management method including the steps of: receiving sensor information indicating a measurement result obtained by a sensor; performing control of displaying a screen on which the measurement result indicated by the received sensor information is associated with the sensor; and performing control of changing a display content of the screen in such a manner as to allow recognition of the sensor the sensor information of which has become unable to be received.

With this configuration, for example, the user can easily distinguish a sensor for which transmission of sensor information to the sensor management device has stopped, from a sensor for which such transmission is being continued. In addition, for example, when the transmission of sensor information from a sensor has stopped, the user can quickly address the work necessary for recovering the sensor, such as investigation of the cause for the stop of the transmission. Thus, it is possible to shorten the period in which the measurement result from the sensor cannot be obtained. Thus, in a configuration in which measurement results obtained by sensors are displayed on a screen, it is possible to support the user in a situation where a measurement result from a sensor has become unable to be obtained on the displaying side.

(13) A sensor management program according to an embodiment of the present invention is a sensor management program to be used in a sensor management device, the sensor management program causing a computer to execute the steps of: receiving sensor information indicating a measurement result obtained by a sensor; performing control of displaying a screen on which the measurement result indicated by the received sensor information is associated with the sensor; and performing control of changing a display content of the screen in such a manner as to allow recognition of the sensor the sensor information of which has become unable to be received.

With this configuration, for example, the user can easily distinguish a sensor for which transmission of sensor information to the sensor management device has stopped, from a sensor for which such transmission is being continued. In addition, for example, when the transmission of sensor information from a sensor has stopped, the user can quickly address the work necessary for recovering the sensor, such as investigation of the cause for the stop of the transmission. Thus, it is possible to shorten the period in which the measurement result from the sensor cannot be obtained. Thus, in a configuration in which measurement results obtained by sensors are displayed on a screen, it is possible to support the user in a situation where a measurement result from a sensor has become unable to be obtained on the displaying side.

(14) A monitoring method according to an embodiment of the present invention is a monitoring method to be performed in a sensor, the monitoring method including the steps of: performing measurement; performing a process of transmitting sensor information indicating a measurement result, to a sensor management device capable of performing control of displaying a screen on which the measurement result indicated by the sensor information is associated with the sensor; and transmitting, to the sensor management device, OFF information indicating that a power source of the sensor has been turned off and identification information of the sensor.

With this configuration, for example, the user can easily grasp that, when transmission of sensor information from a sensor has stopped, the cause for the stop of the transmission is that the power source of the sensor has been turned off. Therefore, in a configuration in which measurement results obtained by sensors are displayed on a screen, it is possible to support the user in a situation where a measurement result from a sensor has become unable to be obtained on the displaying side.

(15) A monitoring program according to an embodiment of the present invention is a monitoring program to be used in a sensor, the monitoring program causing a computer to execute the steps of: performing measurement; performing a process of transmitting sensor information indicating a measurement result, to a sensor management device capable of performing control of displaying a screen on which the measurement result indicated by the sensor information is associated with the sensor; and transmitting, to the sensor management device, OFF information indicating that a power source of the sensor has been turned off and identification information of the sensor.

With this configuration, for example, the user can easily grasp that, when transmission of sensor information from a sensor has stopped, the cause for the stop of the transmission is that the power source of the sensor has been turned off. Therefore, in a configuration in which measurement results obtained by sensors are displayed on a screen, it is possible to support the user in a situation where a measurement result from a sensor has become unable to be obtained on the displaying side.

Hereinafter, an embodiment of the present invention will be described with reference to the drawings. In the drawings, the same or corresponding parts are denoted by the same reference signs, and description thereof is not repeated. At least some parts of the embodiment described below can be combined together as desired.

[Configuration and Basic Operation]

FIG. 1 shows a configuration of a monitoring system according to an embodiment of the present invention.

With reference to FIG. 1, a monitoring system 101 includes a plurality of sensors 11, a sensor management device 12, a display unit 13, and a wireless communication device 14. A configuration may be employed in which the sensor management device 12 includes the display unit 13.

Each sensor 11 includes a battery 15 and operates by electric power supplied from the battery 15. Each sensor 11 is provided in a monitored area such as a plant or a hospital, and performs measurement regarding a monitoring target, such as measurement of temperature, humidity, or electric current, for example.

Each sensor 11 periodically or not periodically creates sensor information which includes: its own identification information, i.e., ID (identification); measurement result information indicating a measurement result; and battery information regarding a stored-power remaining amount of the battery 15, and wirelessly transmits the created sensor information to the wireless communication device 14, in accordance with a communication method such as wireless LAN (local area network) or ZigBee (registered trade mark), for example. The battery information indicates the voltage of the battery 15, for example.

The wireless communication device 14 is, for example, a base station in a wireless LAN, ZigBee, or the like, and transmits the sensor information received from each sensor 11 to the sensor management device 12.

Specifically, when the wireless communication device 14 receives from each sensor 11 a wireless signal that contains sensor information, the wireless communication device 14 adds, to the sensor information, communication quality information which indicates the LQI (Link Quality Indicator) at the time of the reception of the sensor information, and transmits the sensor information having the communication quality information added thereto, to the sensor management device 12.

The sensor management device 12 receives sensor information of each sensor 11 from the wireless communication device 14, and performs control of displaying, on the display unit 13, the content based on each piece of the received sensor information.

Figure 2:
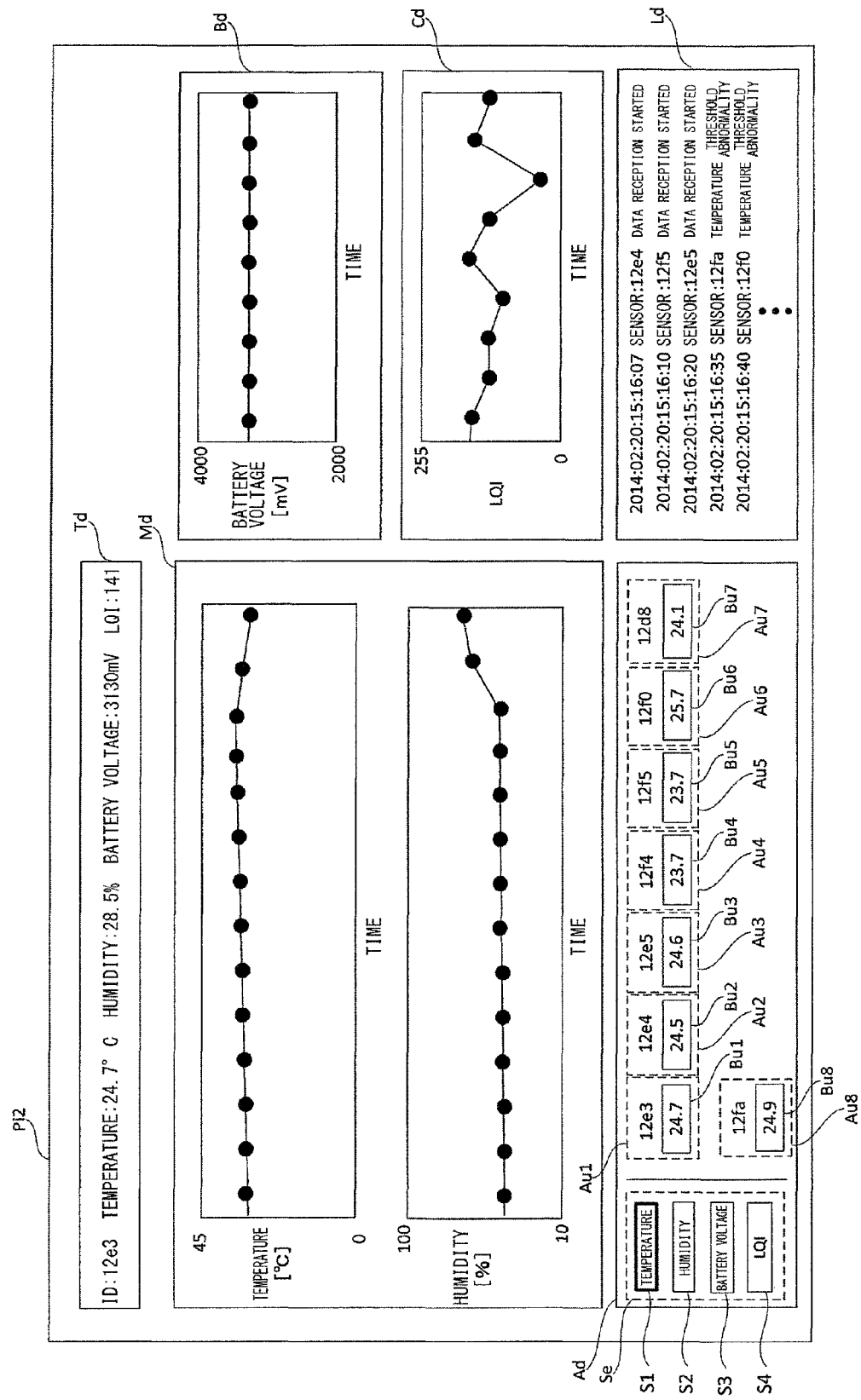
FIG. 2 shows one example of a screen displayed on a display unit in the monitoring system according to the embodiment of the present invention.

FIG. 2 shows one example of a screen displayed on the display unit in the monitoring system according to the embodiment of the present invention.

FIG. 2 shows a screen created by an application AP installed in the sensor management device 12, for example. The application AP periodically updates the screen on the basis of sensor information received by the sensor management device 12, for example.

With reference to FIG. 2, a screen Pi2 includes a data display area Td, a graph display area Md, a button display area Ad, a battery display area Bd, a communication display area Cd, and a log display area Ld.

In the data display area Td, for example, the content of the latest sensor information from a selected sensor 11 is displayed. Specifically, in the data display area Td, "temperature", "humidity", and "battery voltage", i.e., the voltage of the battery 15, which have been measured by the sensor 11 whose ID is "12e3", and the value of "LQI" measured by the wireless communication device 14 are displayed.

In the graph display area Md, a temperature graph and a humidity graph are displayed that have been created on the basis of the measurement result information included in the sensor information from the selected sensor 11. In the battery display area Bd, a voltage graph is displayed that has been created on the basis of the battery information included in the sensor information from the selected sensor 11, and that allows determination regarding the stored-power remaining amount of the battery 15.

In the communication display area Cd, a LQI graph is displayed that has been created on the basis of communication quality information included in the sensor information from the selected sensor 11 and that shows the communication quality between the sensor 11 and the wireless communication device 14.

In the log display area Ld, a history is displayed regarding reception of sensor information by the sensor management device 12, and abnormality etc. detected by the sensor management device 12 on the basis of the measurement result information.

The button display area Ad includes a display part Au1 to a display part Au8, and a display part Se. Hereinafter, each of the display part Au1 to the display part Au8 will also be referred to as a display part Au.

In the example shown in FIG. 2, the monitoring system 101 includes eight sensors 11. The display parts Au1 to Au8 correspond to these eight sensors 11, respectively.

In the display parts Au1 to Au8, buttons Bu1 to Bu8 are displayed, respectively. Hereinafter, each of the buttons Bu1 to Bu8 will also be referred to as a button Bu.

In each button Bu, the latest temperature measured by its corresponding sensor 11 is displayed. On the upper side of each button Bu, the ID of its corresponding sensor is displayed. That is, in each of the display parts Au1 to Au8, the content is displayed in which its corresponding sensor 11 is associated with the measurement result indicated by the sensor information from the sensor 11.

For example, when the sensor management device 12 has received sensor information from a sensor 11 during a period while the screen Pi2 is displayed, the button Bu that corresponds to the sensor 11 on the screen Pi2 temporarily blinks. This allows a user to recognize that the sensor management device 12 has received the sensor information from the sensor 11.

Meanwhile, for example, by clicking a button Bu, the user can cause the content regarding the sensor that corresponds to the clicked button to be displayed in the data display area Td, the graph display area Md, the battery display area Bd, and the communication display area Cd.

Further, in the display part Se, buttons S1 to S4 respectively assigned with characters of "temperature", "humidity", "battery voltage", and "LQI" are displayed.

For example, by clicking any one of the buttons S1 to S4, the user can select the content to be displayed in the buttons Bu1 to Bu8. On the present screen, the button S1 assigned with the characters "temperature" has been selected, and thus, in the buttons Bu1 to Bu8, the temperatures measured by their corresponding sensors 11 are displayed.

[Problem]

Immediately after the start of the application AP, the buttons Bu and their corresponding IDs are not displayed in the button display area Ad on the screen. For example, when the sensor management device 12 has received sensor information after the start of the application AP, a button Bu and its corresponding ID are displayed that correspond to the sensor 11 having transmitted the sensor information. Then, when the sensor management device 12 has received sensor information from a new sensor 11, a combination of a button Bu and its corresponding ID is newly displayed in the button display area Ad.

Here, in a case of a configuration in which, even after the sensor management device 12 has become unable to receive sensor information from a certain sensor 11, the sensor management device 12 continues displaying, on the screen, the button Bu and the ID that correspond to the certain sensor 11, the user cannot easily recognize the sensor 11 whose sensor information is not transmitted to the sensor management device 12.

Therefore, the monitoring system according to the embodiment of the present invention solves such a problem by the process described below.

Figure 3:
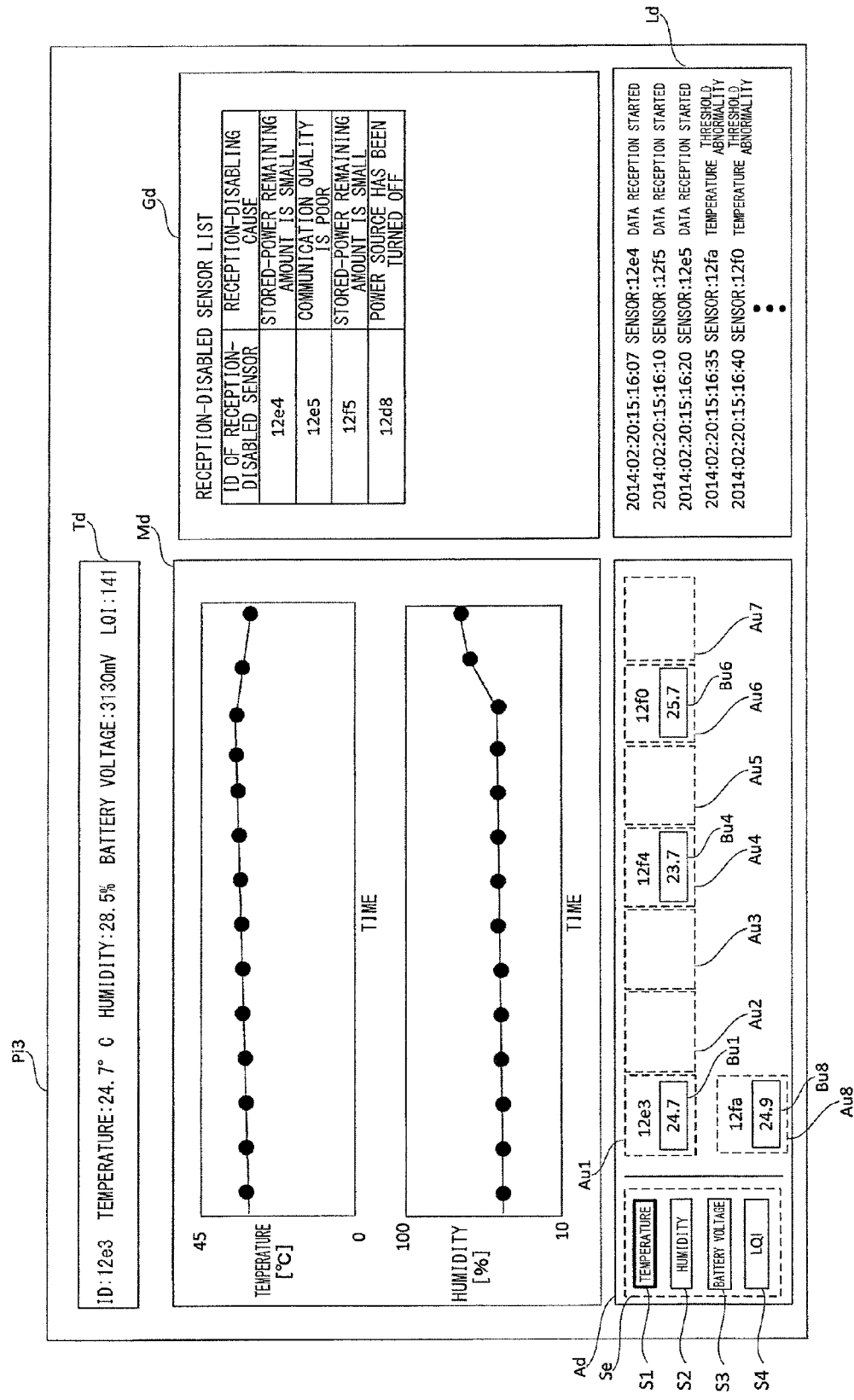
FIG. 3 shows another example of the screen displayed on the display unit in the monitoring system according to the embodiment of the present invention.

FIG. 3 shows another example of the screen displayed on the display unit in the monitoring system according to the embodiment of the present invention.

With reference to FIG. 3, a screen Pi3 includes the data display area Td, the graph display area Md, the button display area Ad, a list display area Gd, and the log display area Ld. That is, when compared with the screen Pi2 shown in FIG. 2, the screen Pi3 includes the list display area Gd instead of the battery display area Bd and the communication display area Cd.

FIG. 3 shows a screen displayed on the display unit 13 when the sensor management device 12 has become unable to receive sensor information from some of the sensors 11 in the monitoring system 101. Specifically, the example shown in FIG. 3 shows a case where, among the eight sensors 11 which are included in the monitoring system 101 and which respectively correspond to the display parts Au1 to Au8, the sensor management device 12 has become unable to receive sensor information from the sensors 11 that correspond to the display parts Au2, Au3, Au5, and Au7.

Hereinafter, a sensor 11 whose sensor information has become unable to be received by the sensor management device 12 will also be referred to as a reception-disabled sensor, and the cause for which the sensor information has become unable to be received by the sensor management device 12 will also be referred as a reception-disabling cause.

In the list display area Gd, a reception-disabled sensor list which is a list of IDs of reception-disabled sensors is displayed. Specifically, the reception-disabled sensor list shows the identification information of each reception-disabled sensor and the reception-disabling cause for the reception-disabled sensor.

In the button display area Ad, contents that allow the user to recognize the reception-disabled sensors are displayed. Specifically, in the button display area Ad on the screen Pi3, among the display parts Au1 to Au8, the contents of the display parts Au that correspond to a reception-disabled sensor are not displayed, compared with the button display area Ad on the screen Pi2 shown in FIG. 2. That is, the display contents of the display parts Au2, Au3, Au5, and Au7 are deleted, respectively.

In this manner, when the sensor management device 12 has become unable to receive sensor information from one or a plurality of the sensors 11, the sensor management device 12 changes the display of on the screen such that the user can recognize the reception-disabled sensor(s).

Figure 4:
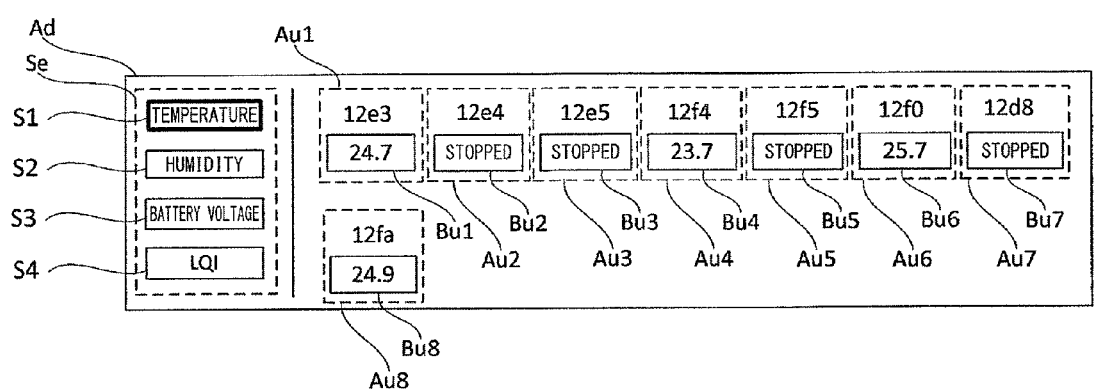
FIG. 4 shows another example of a button display area Ad on the screen displayed on the display unit in the monitoring system according to the embodiment of the present invention.
Figure 5:
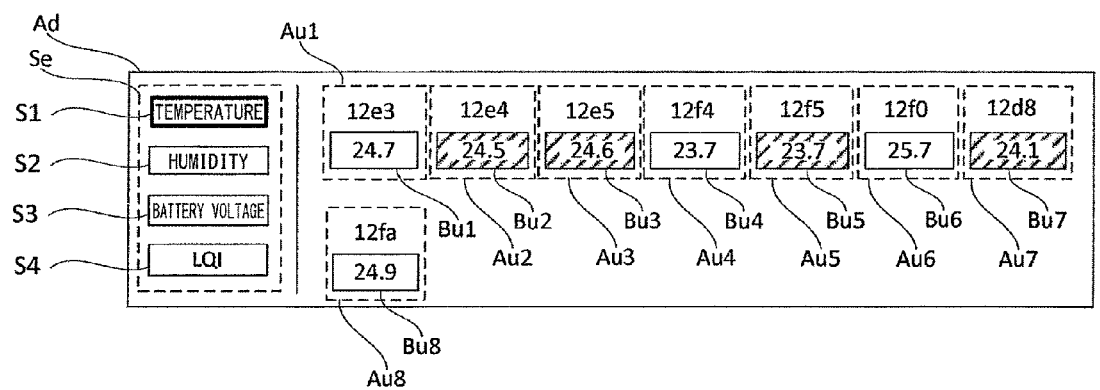
FIG. 5 shows another example of the button display area Ad on the screen displayed on the display unit in the monitoring system according to the embodiment of the present invention.

FIG. 4 and FIG. 5 each show another example of the button display area Ad on the screen displayed on the display unit in the monitoring system according to the embodiment of the present invention.

With reference to FIG. 4, in the button display area Ad, contents that allow the user to recognize the reception-disabled sensors are displayed. Specifically, the display parts Au2, Au3, Au5, and Au7 which are the display parts Au that correspond to the reception-disabled sensors are each in a display mode that is different from the display mode used for the display parts Au2, Au3, Au5, and Au7 on the screen Pi2 shown in FIG. 2.

More specifically, each of the buttons Bu2, Bu3, Bu5, and Bu7 which are the buttons Bu that correspond to the reception-disabled sensors is assigned with the characters "stopped". It should be noted that each of the buttons Bu2, Bu3, Bu5, and Bu7 may be assigned with other characters such as "reception-disabled" or the like.

With reference to FIG. 5, in the button display area Ad, contents that allow the user to recognize the reception-disabled sensors are displayed. Specifically, the display parts Au2, Au3, Au5, and Au7 which are the display parts Au that correspond to the reception-disabled sensors are each in a display mode that is different from the display mode used for the display parts Au2, Au3, Au5, and Au7 on the screen Pi2 shown in FIG. 2.

More specifically, each of the buttons Bu2, Bu3, Bu5, and Bu7 which are the buttons Bu that correspond to the reception-disabled sensors are displayed in a color that is different from the color used in a normal display. It should be noted that the button Bu that corresponds to a reception-disabled sensor may be displayed in a color that is different from the color used in the normal display, and in addition, be assigned with characters such as "stopped" or the like.

[Operation]

Next, a screen displaying process performed in the monitoring system according to the embodiment of the present invention will be described.

Each device in the monitoring system 101 includes a computer. An arithmetic processing unit such as a CPU in the computer reads out a program including a part or the entirety of steps in the following flow charts from a memory not shown, and executes the program. The programs for the plurality of devices can each be installed from outside. The programs for the plurality of devices are each distributed in a state of being stored in a storage medium.

Figure 6:
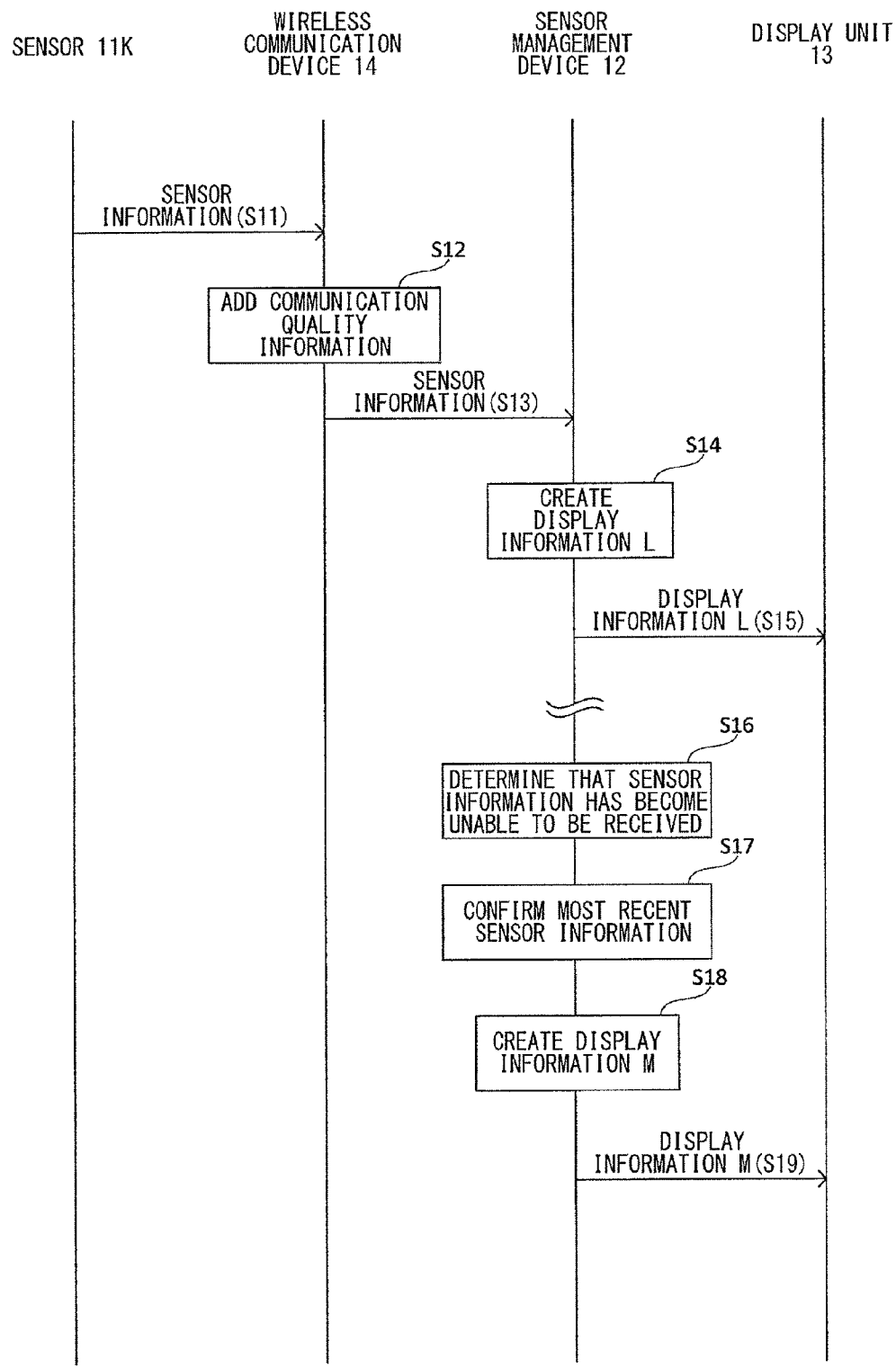
FIG. 6 shows one example of the sequence of a screen displaying process performed in the monitoring system according to the embodiment of the present invention.

FIG. 6 shows one example of the sequence of the screen displaying process performed in the monitoring system according to the embodiment of the present invention.

Hereinafter, for example, among the display parts Au1 to Au8 on the screen Pi2 shown in FIG. 2, the sensor 11 that corresponds to the display part Au2 will be referred to as a sensor 11K. The ID of the sensor 11K is "12e4".

With reference to FIG. 6, first, the sensor 11K creates sensor information on the basis of its own measurement result, and transmits the created sensor information to the wireless communication device 14 (step S11).

Next, the wireless communication device 14 adds, to the sensor information received from the sensor 11K, communication quality information which indicates the LQI at the time of reception of the sensor information (step S12), and transmits the sensor information having the communication quality information added thereto, to the sensor management device 12 (step S13).

Next, upon receiving the sensor information from the wireless communication device 14, the sensor management device 12 creates display information L indicating the display content for the display unit 13, on the basis of the received sensor information (step S14), and transmits the created display information L, to the display unit 13 (step S15).

Next, the display unit 13 displays the content of the display information L received from the sensor management device 12. Here, on the display unit 13, the screen Pi2 shown in FIG. 2 is displayed, for example.

The monitoring system 101 periodically repeats the operations of step S11 to step S15, for example.

Here, in a case where new sensor information has not arrived at the sensor management device 12 for a predetermined time period after the most recent reception timing of sensor information from the sensor 11K, the sensor management device 12 determines that the sensor management device 12 has become unable to receive sensor information from the sensor 11K, and regards the sensor 11K as a reception-disabled sensor (step S16).

Next, the sensor management device 12 confirms the content of the most recent sensor information from the sensor 11K, and determines the cause, i.e., the reception-disabling cause, for which the sensor information from the sensor 11K has become unable to be received.

Specifically, for example, when battery information included in the most recent sensor information indicates that the stored-power remaining amount is small, the sensor management device 12 determines that the reception-disabling cause for the sensor 11K is shortage of the stored-power remaining amount of the battery 15.

When the communication quality information included in the most recent sensor information indicates that the communication quality between the sensor 11K and the wireless communication device 14 is poor, the sensor management device 12 determines that the reception-disabling cause for the sensor 11K is deterioration of the communication quality. Here, it is assumed that the sensor management device 12 determines that the reception-disabling cause for the sensor 11K is shortage of the stored-power remaining amount.

Next, the sensor management device 12 creates, on the basis of its own determination content, display information M indicating the display content for the display unit 13 (step S18), and transmits the created display information M to the display unit 13 (step S19).

Next, the display unit 13 displays the content of the display information M received from the sensor management device 12. On the display unit 13, the screen Pi3 shown in FIG. 3 is displayed, for example. On the screen Pi3, the display content of the display part Au that corresponds to the sensor 11K is deleted. Meanwhile, in the list display area Gd, the reception-disabled sensor list is displayed.

In the reception-disabled sensor list, the ID of the sensor 11K being the reception-disabled sensor, and the reception-disabling cause for the sensor 11K are shown. Specifically, in the reception-disabled sensor list, as the reception-disabling cause for the sensor 11K, that the stored-power remaining amount of the battery 15 is small is indicated.

Although not shown in FIG. 6, as in the case of the sensor 11K, i.e., the sensor 11 that corresponds to the display part Au2, the sensor management device 12 also regards the sensors 11 that respectively correspond to the display parts Au3, Au5, and Au7 as reception-disabled sensors, and creates the reception-disabled sensor list displayed on the screen Pi3.

Figure 7:
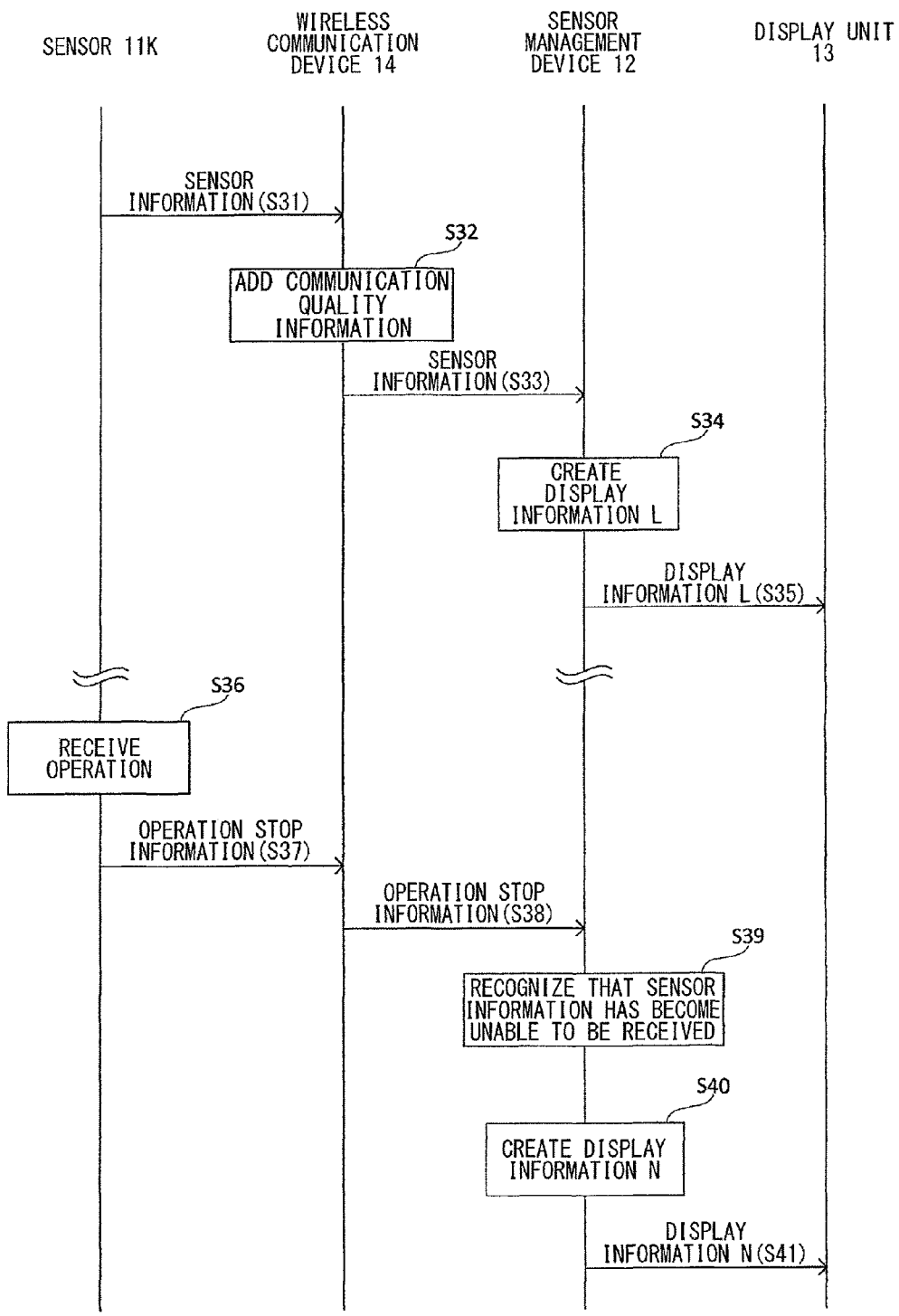
FIG. 7 shows another example of the sequence of the screen displaying process performed in the monitoring system according to the embodiment of the present invention.

FIG. 7 shows another example of the sequence of the screen displaying process performed in the monitoring system according to the embodiment of the present invention.

With reference to FIG. 7, the operations of steps S31 to S35 are the same as the operations of steps S11 to S15 shown in FIG. 6. The monitoring system 101 periodically or not periodically repeats the operations of steps S31 to S35.

Here, for example, the user performs an operation for turning off the power source of the sensor 11K. When the sensor 11K has received this operation (step S36), the sensor 11K creates, before stopping operation thereof, operation stop information that includes its own ID and OFF information indicating that the power source has been turned off, and then, transmits the created operation stop information to the wireless communication device 14 (step S37).

Next, the wireless communication device 14 receives the operation stop information from the sensor 11K, and transmits the received operation stop information to the sensor management device 12 (step S38).

Next, upon receiving the operation stop information from the wireless communication device 14, the sensor management device 12 recognizes that the sensor management device 12 has become unable to receive sensor information from the sensor 11K because the power source of the sensor 11K has been turn off (step S39).

Next, the sensor management device 12 creates display information N indicating the display content for the display unit 13 (step S40), and transmits the created display information N to the display unit 13 (step S41).

Next, the display unit 13 displays the display information N received from the sensor management device 12. Here, on the display unit 13, a screen is displayed that is different from the screen Pi3 shown in FIG. 3 in the points described below, for example. That is, on this screen, the reception-disabled sensor list displayed in the list display area Gd indicates that the reception-disabling cause for the sensor 11K is that the power source of the sensor 11K has been turned off.

Figure 8:
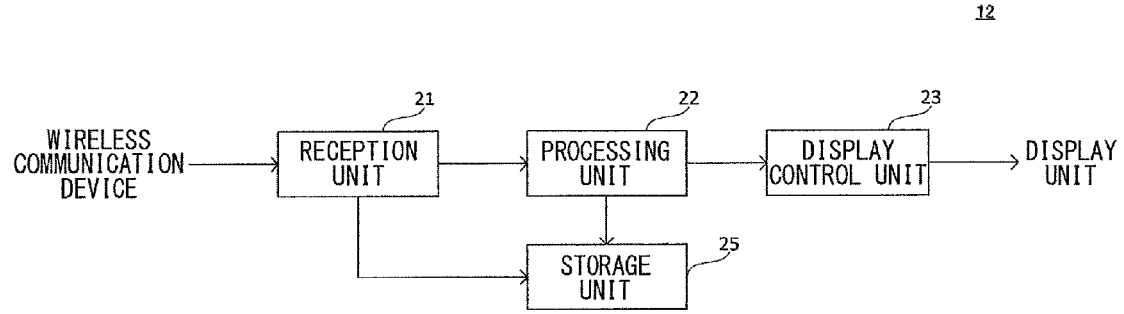
FIG. 8 shows a configuration of a sensor management device according to the embodiment of the present invention.

FIG. 8 shows a configuration of the sensor management device according to the embodiment of the present invention.

With reference to FIG. 8, the sensor management device 12 includes a reception unit 21, a processing unit (determination unit) 22, a display control unit 23, and a storage unit 25.

The reception unit 21 is implemented by a wireless receiver that includes an antenna, an amplifier, a demodulation circuit, and the like, for example. The processing unit 22 and the display control unit 23 are each implemented by a processor, such as a CPU (central processing unit) or an MPU (micro-processing unit), that performs digital signal processing, for example. The storage unit 25 is implemented by a memory such as a RAM or a ROM, for example.

The reception unit 21 receives sensor information indicating a measurement result obtained by each sensor 11. Specifically, for example, the reception unit 21 receives, from the wireless communication device 14, sensor information which includes measurement result information, battery information, and communication quality information, and outputs the received sensor information to the processing unit 22 and the storage unit 25. The storage unit 25 stores therein the sensor information received from the reception unit 21.

On the basis of the sensor information received from the wireless communication device 14, for example, the processing unit 22 creates display information L that contains the contents of the screen Pi2 shown in FIG. 2, for example, and outputs the created display information L to the display control unit 23.

The display control unit 23 performs control of displaying a screen on which the measurement result indicated by the sensor information received by the reception unit 21 is associated with its corresponding sensor 11.

For example, the display control unit 23 transmits the display information L received from the processing unit 22, to the display unit 13. On the display unit 13, the screen Pi2 shown in FIG. 2 is displayed, for example. In each of the display parts Au1 to Au8 on the screen Pi2, a content in which the measurement result indicated by the sensor information is associated with its corresponding sensor 11 is shown.

For example, in a case where the processing unit 22 has not received, from the reception unit 21, new sensor information from the sensor 11K for a predetermined time period after having received, from the reception unit 21, sensor information from the sensor 11K, the processing unit 22 determines that the reception unit 21 has become unable to receive sensor information from the sensor 11K, and regards the sensor 11K as a reception-disabled sensor.

When the processing unit 22 has determined that the reception unit 21 has become unable to receive sensor information from the sensor 11K, the processing unit 22 confirms the contents of the most recent sensor information from the sensor 11K stored in the storage unit 25, and determines the cause, i.e., the reception-disabling cause, for which the sensor information from the sensor 11K has become unable to be received, for example.

Specifically, for example, when the battery information included in the most recent sensor information from the sensor 11K indicates that the stored-power remaining amount is small, the sensor management device 12 determines that the reception-disabling cause for the sensor 11K is shortage of the stored-power remaining amount of the battery 15.

As in the case of the sensor 11K, i.e., the sensor 11 that corresponds to the display part Au2 on the screen Pi2, for example, the processing unit 22 also regards the sensors 11 that respectively correspond to the display parts Au3, Au5, and Au7 as reception-disabled sensors.

The processing unit 22 creates, on the basis of its own determination content, for example, display information M that contains the contents of the screen Pi3 shown in FIG. 3, and outputs the created display information M to the display control unit 23.

The display control unit 23 performs control of changing the display contents of the screen on the display unit 13 in such a manner as to allow recognition of the sensor 11 whose sensor information has become unable to be received by the reception unit 21, i.e., the sensor 11K which is a reception-disabled sensor.

Specifically, for example, the display control unit 23 performs control of deleting, from the screen on the display unit 13, the content in which the reception-disabled sensor is associated with the measurement result of the reception-disabled sensor, i.e., the content of the display part Au2.

At this time, the screen displayed through the control by the display control unit 23 is, for example, a screen that further shows a list of the IDs of reception-disabled sensors, i.e., the reception-disabled sensor list.

Moreover, at this time, the screen displayed through the control by the display control unit 23 is, for example, a screen that shows the cause for which the sensor information from the sensor 11K has become unable to be received by the reception unit 21, i.e., the reception-disabling cause for the sensor 11K. For example, when battery information indicating that the stored-power remaining amount is small has been received by the reception unit 21, the screen indicates that the stored-power remaining amount is small, as the reception-disabling cause.

Specifically, for example, the display control unit 23 transmits display information M to the display unit 13. The processing unit 22 determines the communication quality between the sensor 11 and the sensor management device 12 to which the processing unit 22 belongs.

Specifically, for example, when the processing unit 22 has determined that the reception unit 21 has become unable to receive sensor information from the sensor 11K, if the communication quality information included in the most recent sensor information from the sensor 11K indicates a low level LQI, the processing unit 22 determines that the communication quality between the sensor 11K and the sensor management device 12 to which the processing unit 22 belongs is poor.

Then, the processing unit 22 creates display information W on the basis of its own determination result, and outputs the created display information W to the display control unit 23.

When the communication quality between the sensor 11K and the sensor management device 12 has been determined as being poor by the processing unit 22, the display control unit 23 performs control of displaying a screen indicating that the communication quality is poor, as the reception-disabling cause for the sensor 11.

Specifically, the display control unit 23 transmits the display information W received from the processing unit 22, to the display unit 13.

On the display unit 13, a screen is displayed that is different from the screen Pi3 shown in FIG. 3 in the points described below, for example. That is, on this screen, the reception-disabled sensor list displayed in the list display area Gd indicates that the communication quality is poor, as the reception-disabling cause for the sensor 11K.

Meanwhile, when the processing unit 22 has determined that the reception unit 21 has become unable to receive sensor information from the sensor 11K, if the battery information included in the most recent sensor information from the sensor 11K does not indicate that the stored-power remaining amount is small and the communication quality information included in this sensor information does not indicate that the level of LQI is low, the processing unit 22 determines that the sensor 11K has failed.

Then, the processing unit 22 creates display information U on the basis of its own determination result, and outputs the created display information U to the display control unit 23.

The display control unit 23 performs control of indicating on the screen that the sensor 11K has failed, as the reception-disabling cause for the sensor 11, for example. Specifically, for example, the display control unit 23 transmits the display information U received from the processing unit 22, to the display unit 13.

On the display unit 13, a screen is displayed that is different from the screen Pi3 shown in FIG. 3 in the points described below, for example. That is, on this screen, the reception-disabled sensor list displayed in the list display area Gd indicates that the sensor 11K has failed, as the reception-disabling cause for the sensor 11K.

It should be noted that, when the processing unit 22 has determined that the reception unit 21 has become unable to receive sensor information from the sensor 11K, if the battery information included in the most recent sensor information from the sensor 11K does not indicate that the stored-power remaining amount is small and the communication quality information included in the sensor information does not indicate that the level of the LQI is low, the processing unit 22 may determine that the reception-disabling cause for the sensor 11K is unknown.

In this case, the display control unit 23 performs control of indicating on the screen that the reception-disabling cause for the sensor 11 is unknown, as the reception-disabling cause for the sensor 11, instead of indicating that the sensor 11K has failed.

In a case where the user has performed an operation for turning off the power source of the sensor 11K, the sensor 11 creates, before stopping operation thereof, operation stop information that includes its own ID and OFF information indicating that the power source has been turned off, and transmits the created operation stop information to the wireless communication device 14.

The reception unit 21 receives the operation stop information from sensor 11 via the wireless communication device 14, and outputs the received operation stop information to the processing unit 22, for example.

When the operation stop information has been received by the reception unit 21, the display control unit 23 performs control of displaying a screen indicating that the power source of the sensor 11 has been turned off, as the reception-disabling cause.

Specifically, when the processing unit 22 has received, from the reception unit 21, the operation stop information from the sensor 11K, the processing unit 22 recognizes that the reception unit 21 has become unable to receive sensor information from the sensor 11K because the power source of the sensor 11K has been turned off.

Then, the processing unit 22 creates display information N indicating that the display content for the display unit 13, and transmits the created display information N to the display control unit 23. The display control unit 23 transmits the display information N received from the processing unit 22, to the display unit 13.

On the display unit 13, a screen is displayed that is different from the screen Pi3 shown in FIG. 3 in the points described below, for example. That is, on this screen, the reception-disabled sensor list displayed in the list display area Gd indicates that the power source of the sensor 11K has been turned off, as the reception-disabling cause for the sensor 11K.

While the screen Pi3 shown in FIG. 3 is displayed on the display unit 13, for example, if the processing unit 22 receives, from the reception unit 21, sensor information from the sensor 11K, the processing unit 22 determines that the reception unit 21 has become able to receive sensor information from the sensor 11K again.

Then, the processing unit 22 creates display information P on the basis of its own determination content, and outputs the created display information P to the display control unit 23.

The display control unit 23 performs control of resetting the display content of the screen regarding the sensor 11 whose sensor information has become able to be received by the reception unit 21 again, to the display content not having been changed. Specifically, the display control unit 23 transmits the display information P received from the processing unit 22, to the display unit 13.

On the display unit 13, a screen is displayed that is different from the screen Pi3 shown in FIG. 3 in the points described below, for example. That is, on this screen, the button Bu2 and the ID of the sensor 11K are displayed in the display part Au2.

Figure 9:
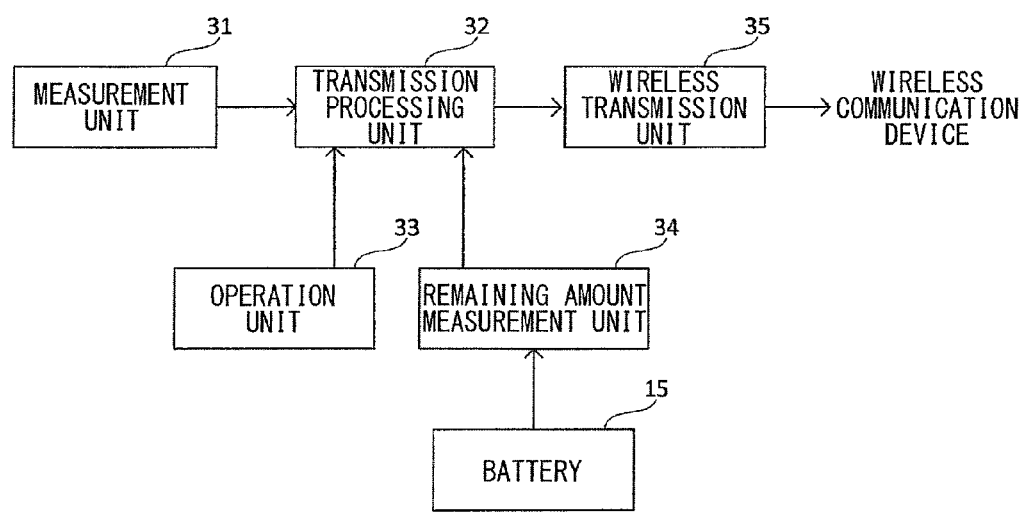
FIG. 9 shows a configuration of a sensor in the monitoring system according to the embodiment of the present invention.

FIG. 9 shows a configuration of the sensor in the monitoring system according to the embodiment of the present invention.

With reference to FIG. 9, the sensor 11 includes a measurement unit 31, a transmission processing unit 32, an operation unit 33, a remaining amount measurement unit 34, and a wireless transmission unit 35.

The measurement unit 31 is implemented by the structure part (such as thermistor in the case of a temperature sensor) of the sensor 11 which is mounted close to a measurement target, for example. The transmission processing unit 32 is implemented by a processor, such as a CPU or an MPU, that performs digital signal processing, for example. The operation unit 33 is implemented by a switch or the like that the user operates with a finger, for example. The remaining amount measurement unit 34 is implemented by a voltage sensor and a processor that converts a measurement result (battery information) from the voltage sensor, into a numerical value, for example. The wireless transmission unit 35 is implemented by a wireless transmitter that includes a modulation circuit, an amplifier, an antenna, and the like, for example.

The measurement unit 31 performs measurement regarding a monitoring target, and outputs measurement result information indicating the measurement result, to the transmission processing unit 32.

The remaining amount measurement unit 34 measures the voltage of the battery 15, and creates battery information indicating the measured voltage. Then, the remaining amount measurement unit 34 outputs the created battery information to the transmission processing unit 32.

The transmission processing unit 32 creates sensor information that includes the ID of the sensor 11 to which the transmission processing unit 32 belongs, the measurement result information received from the measurement unit 31, and the battery information received from the remaining amount measurement unit 34, and outputs the created sensor information to the wireless transmission unit 35.

The wireless transmission unit 35 transmits, to the wireless communication device 14, a wireless signal that contains the sensor information received from the transmission processing unit 32.

When the operation unit 33 receives from the user an operation for turning off the power source of the sensor 11 to which the operation unit 33 belongs, the operation unit 33 notifies the transmission processing unit 32 of the content of the operation.

Upon receiving the notification from the operation unit 33, the transmission processing unit 32 creates operation stop information that includes: the ID of the sensor 11 to which the operation unit 33 belongs; and OFF information indicating that the power source of the sensor 11 has been turned off, and outputs the created operation stop information to the wireless transmission unit 35.

The wireless transmission unit 35 transmits, to the sensor management device 12, a wireless signal that contains the operation stop information received from the transmission processing unit 32.

In the monitoring system 101 according to the embodiment of the present invention, each sensor 11 and the wireless communication device 14 are configured to be in wireless connection with each other. However, the present invention is not limited thereto, and each sensor 11 and the wireless communication device 14 a may be configured to be in wired connection with each other.

In the monitoring system 101 according to the embodiment of the present invention, the wireless communication device 14 and the sensor management device 12 are configured to be in wired connection with teach other. However, the present invention is not limited thereto, and the wireless communication device 14 and the sensor management device 12 may be configured to be in wireless connection with each other.

The monitoring system 101 according to the embodiment of the present invention is configured to include the wireless communication device 14. However, the present invention is not limited thereto, and the monitoring system 101 may be configured not to include the wireless communication device 14. In this case, each sensor 11 transmits sensor information and operation stop information, directly to the sensor management device 12.

Each sensor 11 according to the embodiment of the present invention is configured to include the wireless transmission unit 35. However, the present invention is not limited thereto, and the sensor 11 may be configured not to include the wireless transmission unit 35. In this case, the transmission processing unit 32 transmits sensor information and operation stop information to the wireless transmission unit 35 provided outside the sensor 11.

The sensor 11 according to the embodiment of the present invention is configured to include the battery 15. However, the present invention is not limited thereto, and the sensor 11 may be configured not to include the battery 15. In this case, the sensor 11 operates by electric power supplied from outside.

Meanwhile, in the technology described in PATENT LITERATURE 1, there are cases where a measurement result from a certain sensor has become unable to be obtained on the displaying side due to some cause. However, PATENT LITERATURE 1 does not disclose any configuration for solving such a problem.

In contrast to this, in the case of the sensor management device according to the embodiment of the present invention, the reception unit 21 receives sensor information indicating the measurement result obtained by the sensor 11. The display control unit 23 performs control of displaying a screen on which the measurement result indicated by the sensor information received by the reception unit 21 is associated with its corresponding sensor 11. The display control unit 23 performs control of changing the display content of the screen in such a manner as to allow recognition of the sensor 11 whose sensor information has become unable to be received by the reception unit 21.

Moreover, in the monitoring system according to the embodiment of the present invention, each sensor 11 transmits sensor information indicating its own measurement result, to the sensor management device 12. The sensor management device 12 receives the sensor information transmitted from each sensor 11, and performs control of displaying a screen on which the measurement result indicated by the received sensor information is associated with its corresponding sensor 11. The sensor management device 12 performs control of changing the display content of the screen in such a manner as to allow recognition of a sensor 11 whose sensor information has become unable to be received by the sensor management device 12.

With this configuration, for example, the user can easily distinguish a sensor 11 for which transmission of sensor information to the sensor management device 12 has stopped, from a sensor 11 for which such transmission is being continued. In addition, for example, when the transmission of sensor information from a sensor 11 has stopped, the user can quickly address the work necessary for recovering the sensor 11, such as investigation of the cause for the stop of the transmission. Thus, it is possible to shorten the period in which the measurement result from the sensor 11 cannot be obtained.

Therefore, with the sensor management device and the monitoring system according to the embodiment of the present invention, in a configuration in which measurement results obtained by sensors are displayed on a screen, it is possible to support the user in a situation where a measurement result from a sensor has become unable to be obtained on the displaying side.

Moreover, in the sensor management device according to the embodiment of the present invention, the display control unit 23 performs control of deleting, from the screen, the content in which the sensor 11 whose sensor information has become unable to be received by the reception unit 21 is associated with its measurement result.

With this configuration, for example, the user can recognize the sensor 11 for which the transmission of sensor information to the sensor management device 12 is being continued, and when the screen display looks complicated, such complicated appearance can be eliminated.

Moreover, without the application AP being restarted, the display corresponding to the sensor 11 for which the transmission has stopped can be deleted from the button display area Ad. Therefore, the work for restarting the application AP can be omitted.

Moreover, in the sensor management device according to the embodiment of the present invention, the display control unit 23 performs control of displaying a screen further showing the cause for which the sensor information has become unable to be received by the reception unit 21.

With this configuration, for example, the user can easily grasp the cause for which the transmission of sensor information from the sensor 11 has stopped, without conducting investigation himself or herself. Thus, recovery of the transmission of sensor information can be efficiently performed.

Moreover, in the sensor management device according to the embodiment of the present invention, the reception unit 21 receives, from a sensor 11, OFF information indicating that the power source of the sensor 11 has been turn off. When the reception unit 21 has received the OFF information, the display control unit 23 performs control of displaying a screen indicating, as the cause, that the power source of the sensor 11 has been turned off.

With this configuration, the user can easily grasp that the cause for which the transmission of sensor information from the sensor 11 has stopped is that the power source of the sensor 11 has been turned off.

Moreover, in the sensor management device according to the embodiment of the present invention, the processing unit (determination unit) 22 determines the communication quality between the sensor 11 and the sensor management device 12 to which the processing unit 22 belongs. When the communication quality has been determined as being poor by the processing unit 22, the display control unit 23 performs control of displaying a screen indicating, as the cause, that the communication quality is poor.

With this configuration, the user can easily grasp that the cause for which the transmission of sensor information from the sensor 11 has stopped is deterioration of the communication quality between the sensor 11 and the sensor management device 12.

Moreover, in the sensor management device according to the embodiment of the present invention, the reception unit 21 receives, from each sensor 11, battery information regarding the stored-power remaining amount of the battery of the sensor 11. When battery information indicating that the stored-power remaining amount is small has been received by the reception unit 21, the display control unit 23 performs control of displaying a screen indicating, as the cause, that the stored-power remaining amount is small.

With this configuration, the user can easily grasp that the cause for which the transmission of sensor information from the sensor 11 has stopped is shortage of the stored-power remaining amount of the battery in the sensor 11.

Moreover, in the sensor management device according to the embodiment of the present invention, the display control unit 23 performs control of displaying a screen indicating, as the cause, that the sensor 11 has failed, or that the cause is unknown, instead of indicating the cause.

With this configuration, the user can recognize that the cause for which the transmission of sensor information from the sensor 11 has stopped is a cause other than the cause that can be determined by the sensor management device 12.

Moreover, in the sensor management device according to the embodiment of the present invention, the display control unit 23 performs control of displaying a screen further showing the reception-disabled sensor list which is a list of identification information of sensors 11 whose sensor information has become unable to be received by the reception unit 21.

With this configuration, the user can confirm the list of sensors 11 for which the transmission of sensor information to the sensor management device 12 has stopped.

Moreover, in the sensor management device according to the embodiment of the present invention, the display control unit 23 performs control of resetting the display content of the screen regarding the sensor 11 whose sensor information has become able to be received by the reception unit 21 again, to the display content not having been changed.

With this configuration, for example, the user can recognize that the transmission of sensor information to the sensor management device 12 has been resumed. In addition, when sensor information has become able to be received in the sensor management device 12 again, the display of the screen can be automatically updated.

Moreover, in the sensor according to the embodiment of the present invention, the measurement unit 31 performs measurement. The transmission processing unit 32 performs a process of transmitting sensor information indicating a measurement result obtained by the measurement unit 31, to the sensor management device 12 capable of performing control of displaying a screen on which the measurement result indicated by the sensor information is associated with its corresponding sensor 11. The transmission processing unit 32 performs a process of transmitting, to the sensor management device 12, OFF information indicating that the power source of the sensor 11 to which the transmission processing unit 32 belongs has been turned off and identification information of the sensor 11.

With this configuration, for example, the user can easily grasp that, when the transmission of sensor information from a sensor 11 has stopped, the cause for the stop of the transmission is that the power source of the sensor 11 has been turned off.

Therefore, with the sensor according to the embodiment of the present invention, in a configuration in which measurement results obtained by sensors are displayed on a screen, it is possible to support the user in a situation where a measurement result from a sensor has become unable to be obtained on the displaying side.

It should be understood that the above embodiment is merely illustrative and not restrictive in all aspects. The scope of the present invention is defined by the scope of the claims rather than the above description, and is intended to include meaning equivalent to the scope of the claims and all modifications within the scope.

The above description includes the features in the additional notes below.

[Additional Note 1]

A sensor management device including:

a reception unit configured to receive sensor information indicating a measurement result obtained by a sensor; and a display control unit configured to perform control of displaying a screen on which the measurement result indicated by the sensor information received by the reception unit is associated with the sensor, wherein the reception unit receives the sensor information from one or a plurality of the sensors, the display control unit sets a display mode for a content in which a sensor the sensor information of which has become unable to be received by the reception unit is associated with the measurement result thereof, to a display mode that is different from a display mode used for a content in which another sensor is associated with the measurement result thereof, and the reception unit receives the sensor information wirelessly transmitted from the sensor(s).

[Additional Note 2]

A sensor including:

a measurement unit configured to perform measurement; and a transmission processing unit configured to perform a process of transmitting sensor information indicating a measurement result obtained by the measurement unit, to a sensor management device capable of performing control of displaying a screen on which the measurement result indicated by the sensor information is associated with the sensor, wherein the transmission processing unit further performs a process of transmitting, to the sensor management device, OFF information indicating that a power source of the sensor has been turned off and identification information of the sensor, and the sensor information is wirelessly transmitted to the sensor management device.

REFERENCE SIGNS LIST 11, 11K sensor
12 sensor management device
13 display unit
14 wireless communication device
15 battery
21 reception unit
22 processing unit
23 display control unit
25 storage unit
31 measurement unit
32 transmission processing unit
33 operation unit
34 remaining amount measurement unit
35 wireless transmission unit
101 monitoring system

The invention claimed is:

1. A sensor management device comprising:
a reception unit configured to receive sensor information transmitted wirelessly from a sensor indicating a measurement result obtained by the sensor; and
a display control unit configured to perform control of displaying a screen including an area on which the measurement result indicated by the sensor information received by the reception unit is associated with the sensor,
wherein the display control unit performs control of changing a display content of the area on which the measurement result is associated with the sensor of which the sensor information has become unable to be received by the reception unit after displaying the screen,
wherein the display control unit further performs control of displaying a cause of which the sensor information has become unable to be received by the reception unit on the screen,
wherein the reception unit further wirelessly receives from the sensor, before stopping operation thereof, sensor OFF information indicating that a power source of the sensor has been turned off, and
wherein when the OFF information has been received by the reception unit, the display control unit performs control of displaying the cause that the power source of the sensor has been turned off on the screen.

2. The sensor management device according to claim 1, wherein
the display control unit performs control of deleting, from the area, a content in which the sensor of which the sensor information has become unable to be received by the reception unit is associated with the measurement result after displaying the screen.

3. The sensor management device according to claim 1, further comprising
a determination unit configured to determine communication quality between the sensor and the sensor management device, wherein
when the communication quality has been determined as being poor by the determination unit, the display control unit performs control of displaying the screen indicating, as the cause, that the communication quality is poor.

4. The sensor management device according to claim 1, wherein
the reception unit further receives, from the sensor, battery information regarding a stored-power remaining amount of a battery of the sensor, and
when the battery information indicating that the stored-power remaining amount is small has been received by the reception unit, the display control unit performs control of displaying the screen indicating, as the cause, that the stored-power remaining amount is small.

5. The sensor management device according to claim 1, wherein
the display control unit performs control of displaying the screen indicating, as the cause, that the sensor has failed, or displaying the screen indicating that the cause is unknown.

6. The sensor management device according to claim 1, wherein
the display control unit performs control of displaying the screen further showing a list of identification information of the sensor of which the sensor information has become unable to be received by the reception unit.

7. The sensor management device according to claim 1, wherein
the display control unit performs control of resetting the display content of the area on which the measurement result is associated with the sensor of which the sensor information has become able to be received by the reception unit again after changing the content of the area, to the display content not having been changed.

8. A monitoring system comprising:

a sensor that transmits sensor information wirelessly indicating a measurement result obtained by the sensor; and a sensor management, wherein the sensor management device includes:

a reception unit configured to receive sensor information transmitted wirelessly from the sensor indicating a measurement result obtained by the sensor; and a display control unit configured to perform control of displaying a screen including an area on which the measurement result indicated by the sensor information received by the reception unit is associated with the sensor, wherein the display control unit performs control of changing a display content of the area on which the measurement result is associated with the sensor of which the sensor information has become unable to be received by the reception unit after the displaying the screen, and wherein the display control unit further performs control of displaying a cause of which the sensor information has become unable to be received by the reception unit on the screen, wherein wherein the sensor transmits wirelessly, to the sensor management device, OFF information indicating that a power source of the sensor has been turned off and identification information of the sensor before stopping operation thereof, and wherein when the OFF information has been received by the reception unit, the sensor management device performs control of displaying the cause that the power source of the sensor has been turned off on the screen.

9. A sensor management method, comprising:

receiving sensor information indicating a measurement result obtained by the sensor;

performing control of displaying a screen including an area on which the measurement result indicated by the received sensor information is associated with a sensor; and performing control of changing a display content of the of the sensor area on which the measurement result is associated with the sensor of which the sensor information has become unable to be received after the displaying the screen, wherein the step of performing control of changing the display content includes a step of performing control of displaying a cause of which the sensor information has become unable to be received on the screen, and wherein when OFF information indicating that a power source of the sensor has been turned off has been transmitted wirelessly from the sensor before stopping operation thereof and received in the step of receiving, the cause that the power source of the sensor has been turned off is displayed on the screen in the step of performing control of displaying the cause.

10. A non-transitory computer readable storage medium storing a sensor management program, the sensor management program causing a computer to execute the steps of:

receiving sensor information transmitted wirelessly from a sensor indicating a measurement result obtained by the sensor;

performing control of displaying a screen including an area on which the measurement result indicated by the received sensor information is associated with the sensor; and performing control of changing a display content of the area on which the measurement result is associated with the sensor of which the sensor information has become unable to be received after displaying the screen, wherein the step of performing control of changing the display content includes a step of performing control of displaying a cause of which the sensor information has become unable to be received on the screen, and wherein when OFF information indicating that a power source of the sensor has been turned off has been transmitted wirelessly from the sensor before stopping operation thereof and received in the step of receiving, the cause that the power source of the sensor has been turned off is displayed on the screen in the step of performing control of displaying the cause.

* * * * *